M. P. HOLMES.
TRUCK.
APPLICATION FILED OCT. 17, 1917.

1,302,925.

Patented May 6, 1919.
2 SHEETS—SHEET 1.

Inventor:
Morris P. Holmes.
by
atty.

M. P. HOLMES.
TRUCK.
APPLICATION FILED OCT. 17, 1917.

1,302,925.

Patented May 6, 1919.
2 SHEETS—SHEET 2.

Inventor:
Morris P. Holmes
by
Att'y.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,302,925.  Specification of Letters Patent.  Patented May 6, 1919.

Application filed October 17, 1917. Serial No. 197,085.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks.

It has for its object to provide an improved truck especially adapted to use in connection with service on tracks of varying gage, such as those encountered in mines or the like. A further and more specific object of my invention is to provide an improved truck especially adapted to use in connection with a mining machine to transport the latter over tracks of varying gage, the same truck through my improved construction being adapted to use upon tracks of widely different gages. A still more specific object of my invention is to provide improved and simplified means whereby the gage of the truck may be varied as desired.

In the accompanying drawings, I have shown for purposes of illustration one embodiment which my invention may assume in practice, illustrating the same as applied to a mining machine truck.

In these drawings,—

Figure 1:
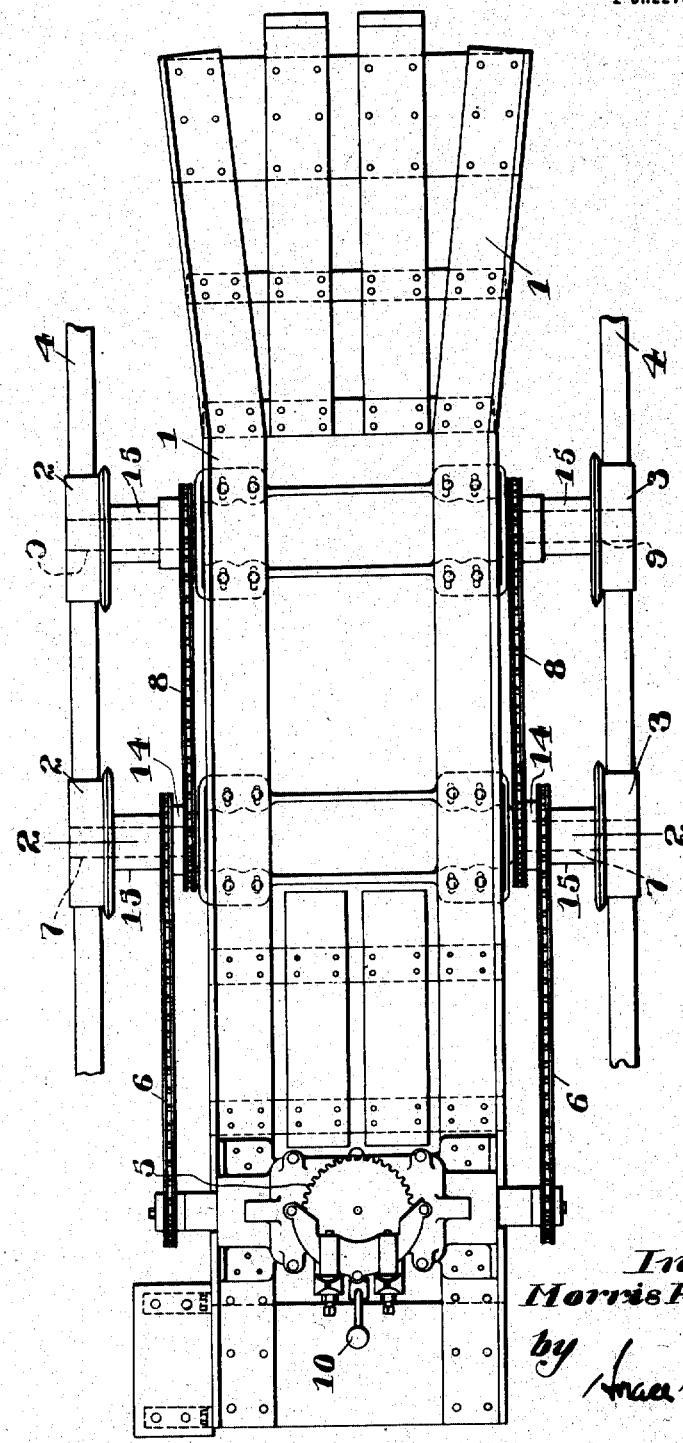
Figure 1 is a plan view of the truck equipped with my improvement.

In this illustrative disclosure, it will be observed that I have shown a machine guiding frame 1, which may be of any suitable construction, mounted upon wheels 2 and 3 which are in turn adapted to move upon a track 4. As in the usual mining machine truck construction, this frame 1 is provided with propelling means at its rear end adapted to engage and coöperate with a mining machine (not shown) when the latter is carried on the truck. As shown, a gear 5 is provided adapted to engage with a moving part of the mining machine, and this gear is connected through suitable truck driving mechanism to a plurality of forwardly extending chain and sprocket connections 6 on the rear axles 7, similar chain and sprocket connections 8 being made between the rear axles 7 and the front axles 9. As usual in such constructions, suitable brake and clutch mechanism 10 adapted to control the truck driving mechanism is provided, the same preferably including a single controlling lever located at the rear of the truck.

Figure 2:
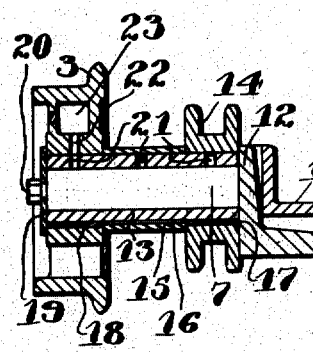
Fig. 2 is a sectional view taken on line 2—2 of Fig. 1.
Figure 2:
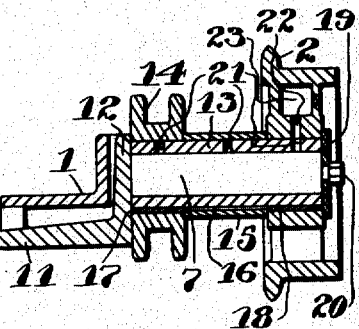

In my improved construction, it will be observed that the connection of the front and rear wheels to the frame 1 is substantially the same, so that a description of one of the same will suffice for both. We will accordingly refer to Fig. 2. In this figure, it will be noted that the frame 1 is of the drop axle type and disposed over a suitable axle box 11, which has upstanding portions or flanges 12 at its opposite sides, on which the axles 7 are formed in the shape of integral stubs. Carried upon each of these stub axles 7, is a rotatable bearing sleeve 13 of hardened material adapted to abut against the outer face of the upstanding portion 12 on the member 11, and preferably of sufficient length to carry, first, the sprocket 14 of the chain connection 6, second, a spacing member 15, preferably of the pipe washer type, and, third, the wheel 2, the sleeve being slotted longitudinally at 16 and having the elements 14 and 2 keyed thereto by keys 17 and 18. As shown, each of these elements 13, 14, 15 and 2, is suitably held in position by means of an outside plate 19 which is preferably of larger diameter than the stub axles 7 and the sleeve 13, and adapted to be pressed against the outer surface of the wheel hub by means of a suitable clamping element, as for instance a screw or bolt 20. Thus, it will be observed that the parts are operatively connected in such a manner that when the member 20 is screwed down, each wheel 2 is held in position at the end of its stub axle 7, while the sprocket 14 is held in position adjacent the truck and on the opposite side of the spacing member 15 from the wheel. As shown, it will also be noted that the axle 7 and bearing sleeve may be suitably lubricated by providing suitable lubricant ports 21 in the sleeve, adapted to register with a similar port 22 in one of the elements carried thereby, as for instance the wheel 2, a suitable lubricant containing chamber 23 being preferably provided in the latter.

Figure 3:
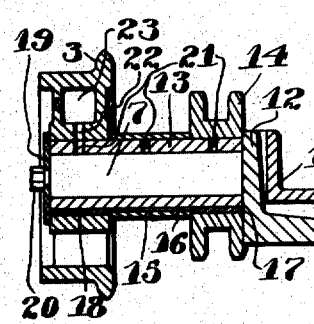
Fig. 3 is a similar sectional view showing the parts adjusted for a different gage.
Figure 3:
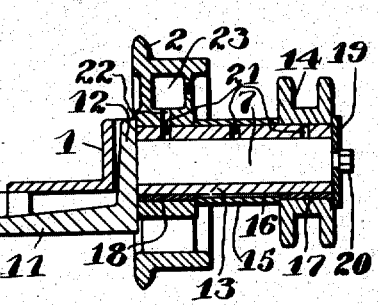
Figure 4:
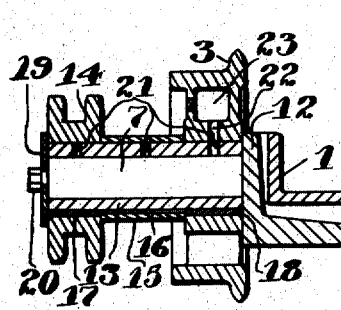
Fig. 4 is a sectional view also similar to Fig. 2, showing the parts adjusted for a still different gage.
Figure 4:
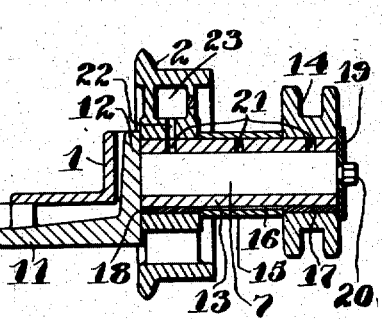
Figure 5:
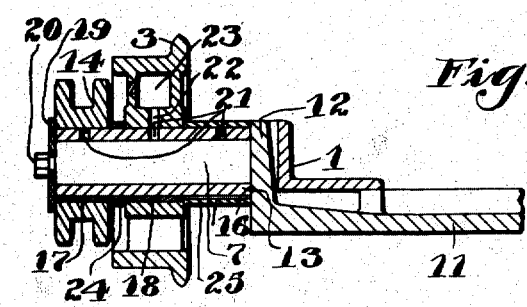
Fig. 5 is a similar sectional view showing a modified construction.

In my improved construction, it is only necessary to adjust the elements above described in order to bring about a wide variation in the gage of the truck. For instance, two adjustments of these parts are shown in Figs. 3 and 4. Referring first to the position of the parts shown in Fig. 3, it will be observed that the parts at the left hand side of the truck are left in identically the same position as occupied in Fig. 2, while those at the right hand side of the truck are adjusted with the sprocket wheel 14 and wheel 2 reversed so that the latter is brought closely adjacent the truck while the sprocket wheel 14 is brought at the end of the stub axle 7, the sleeve and spacing member occupying their original positions. Obviously, thus the gage of the truck will be reduced by the amount that the right hand wheel 2 has been moved inward. In the position of the parts shown in Fig. 4, it will also be observed that not only the right hand wheel has been adjusted, but that the left hand wheel has also been adjusted in such a manner as to bring it closer to the truck body, the parts on the left hand side of the truck assuming the same position relative to the truck as those on the right hand side of the same. Obviously, in this position of the parts the gage of the truck will be further reduced so that it may operate on a track of narrower gage. In connection with these various positions, it will also be observed that if desired the truck gage may be still further varied, as shown in Fig. 5, by providing a plurality of narrow spacing members 24, 25 of different width in lieu of the single spacing member 15, and inserting one of these members between the wheel and the frame and the other between the wheel and the sprocket. Obviously, by varying the width of these members or transposing the same, still further variations in gage may be obtained, so that the wheel 2 may occupy practically any position desired along the length of the axle member 7, although by the provision of the elements described in connection with Figs. 2 to 4 all usual variations in gage will be met.

In the use of my improved construction, it will be observed that it is possible to vary the gage of the truck within wide limits without the necessity for providing any supplementary parts, the several elements adapted to one position of adjustment being also adapted to other positions of adjustment by a simple transposition of the same. It will also be observed that due to the use of my improvement it is possible, if desired, to apply my invention in connection with a truck of the drop axle type, wherein the axle is formed integral with the frame, the sleeve acting as the bearing member rotatable relative to the axle in all positions of the parts and thus bringing all the wear upon one hardened member as distinguished from the other elements, at the same time that it is made possible to lubricate the parts when desired by providing suitable registering perforations in the sleeve and one or more of the elements carried thereon. Attention is also directed to the fact that the construction shown is exceedingly simple and rugged so that it is adapted to long use in service. These and other advantages of my improved construction will, however, be clearly apparent to those skilled in the art.

While I have in this application specifically described this form of my invention, it will be understood that the same is adapted to use in other forms without departing from its spirit, and that it is my intention to include all such modifications within the scope of the appended claims.

What I claim as new and desire to secure by Letters Patent is:

1. In a truck, a truck frame, an axle member thereon, a sleeve rotatably mounted on said axle member, a truck wheel on said sleeve, and means for adjusting said wheel into a plurality of operative positions along said sleeve.

2. In a truck, a truck frame, an axle member thereon, a sleeve on said axle member, a truck wheel on said sleeve, and means including a coöperating spacing member for adjusting said wheel into a plurality of positions along said sleeve.

3. In a truck, a truck frame, an axle member thereon, a sleeve on said axle member, a truck wheel on said sleeve, and means including a coöperating spacing member and sprocket for adjusting said wheel into a plurality of positions along said sleeve.

4. In a truck, a truck frame having an axle thereon, a sleeve rotatably mounted on said axle, a sprocket carried on said sleeve, a wheel carried on said sleeve, and spacing means between certain of said elements.

5. In a truck, a truck frame having an axle thereon, a sleeve rotatably mounted on said axle, a sprocket carried on said sleeve, a wheel carried on said sleeve, spacing means between certain of said elements, and means operatively connected to the end of said axle for clamping said elements in position.

6. In a truck, a truck frame, an axle member thereon, a sleeve rotatable on said axle member, a truck wheel on said sleeve, means for adjusting said wheel into a plurality of operative positions along said sleeve, and means formed integrally with said wheel for supplying lubricant through said wheel to said sleeve and axle member.

7. In a truck, a truck frame, an axle member thereon, a sleeve rotatable on said axle member, a truck wheel on said sleeve, said wheel comprising a hollow spoke, means for adjusting said wheel into a plurality of operative positions along said sleeve, and means including a lubricating chamber in said hollow spoke and communicating lubricating ports in said wheel and sleeve for supplying lubricant to said axle.

8. In a truck, a truck frame having an axle thereon, a sleeve rotatably mounted on said axle, a sprocket carried on said sleeve, a wheel carried on said sleeve, spacing means between certain of said elements, and means operatively connected to the end of said axle and of greater diameter than a plurality of said members for operatively clamping said elements together.

9. In a truck, a truck frame, an axle thereon, a sleeve rotatably mounted on said axle and having a length substantially equal to that of the axle, a truck wheel on said sleeve, and means for adjusting said wheel into a plurality of operative positions along said sleeve.

10. In a truck, a truck frame, an axle thereon, a sleeve rotatably mounted on said axle and bearing on said axle throughout the length of the latter, a truck wheel on said sleeve, and means for adjusting said wheel into a plurality of operative positions along said sleeve.

11. In a truck, a truck frame, an axle thereon, a sleeve rotatably mounted on said axle and having contact with the axle throughout the length of the latter, a truck wheel on said sleeve, and means for adjusting said wheel into a plurality of operative positions along said sleeve.

In testimony whereof I affix my signature.

MORRIS P. HOLMES.

Copies of this patent may be obtained for five cents each, by addressing the "Commissioner of Patents, Washington, D. C."